(12) United States Patent
Yang et al.

(10) Patent No.: US 10,879,717 B2
(45) Date of Patent: Dec. 29, 2020

(54) TECHNIQUES FOR CHARGING A BATTERY PACK WHILE THE BATTERY PACK OPERATES AS A BACKUP POWER SOURCE TO A DEVICE

(71) Applicant: EMC IP HOLDING COMPANY LLC, Hopkinton, MA (US)

(72) Inventors: Tao Yang, Shanghai (CN); Jing Chen, Epping (AU); Jesse Xizhi Cui, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 344 days.

(21) Appl. No.: 15/387,974

(22) Filed: Dec. 22, 2016

(65) Prior Publication Data
US 2017/0194796 A1 Jul. 6, 2017

(30) Foreign Application Priority Data
Dec. 31, 2015 (CN) .......................... 2015 1 1030883

(51) Int. Cl.
*H02J 7/00* (2006.01)
*H01M 10/44* (2006.01)
*H02J 7/04* (2006.01)

(52) U.S. Cl.
CPC ....... *H02J 7/00712* (2020.01); *H01M 10/441* (2013.01); *H02J 7/007* (2013.01); *H02J 7/0014* (2013.01); *H02J 7/0016* (2013.01); *H02J 7/0021* (2013.01); *H02J 7/0071* (2020.01); *H02J 7/007182* (2020.01); *H02J 7/04* (2013.01)

(58) Field of Classification Search
CPC ........ H02J 7/007; H02J 7/0014; H02J 7/0016; H02J 7/0021; H02J 7/0073; H02J 7/04; H02J 7/041; H02J 7/00712; H02J 7/007182; H01M 10/441
USPC ........ 320/116, 118, 134, 136, 137, 162, 163
See application file for complete search history.

(56) References Cited

U.S. PATENT DOCUMENTS

| | | | | |
|---|---|---|---|---|
| 4,686,443 A | * | 8/1987 | Steblay | H02J 7/00047 320/125 |
| 2007/0103113 A1 | * | 5/2007 | Embrey | H02J 7/0011 320/112 |
| 2014/0159664 A1 | * | 6/2014 | Yoshida | H01M 10/4207 320/116 |
| 2015/0137769 A1 | * | 5/2015 | Chen | H02J 7/0052 320/157 |
| 2015/0244187 A1 | | 8/2015 | Horie | |
| 2016/0218525 A1 | * | 7/2016 | Takao | H02J 7/0016 |
| 2020/0076207 A1 | * | 3/2020 | Xu | H02J 7/0019 |

FOREIGN PATENT DOCUMENTS

CN 103280858 9/2013

\* cited by examiner

*Primary Examiner* — Richard Isla
*Assistant Examiner* — Manuel Hernandez
(74) *Attorney, Agent, or Firm* — BainwoodHuang

(57) ABSTRACT

Embodiments of the present disclosure relate to a method and apparatus for charging a battery pack. The method comprises: detecting voltages of batteries in the battery pack in real time; charging the battery pack with a charging current that is at least based on the detected voltages; and performing, on the batteries in the battery pack, balance charging by a digital discharging signal. A solution according to the present disclosure may reduce the costs and achieve a more flexible and safe charging approach.

10 Claims, 4 Drawing Sheets

TECHNIQUES FOR CHARGING A BATTERY PACK WHILE THE BATTERY PACK OPERATES AS A BACKUP POWER SOURCE TO A DEVICE

RELATED APPLICATIONS

This application claim priority from Chinese Patent Application Number CN201511030883.1, filed on Dec. 31, 2015 at the State Intellectual Property Office, China, titled "METHOD AND DEVICE FOR CHARGING A BATTERY PACK" the contents of which is herein incorporated by reference in its entirety.

FIELD OF THE INVENTION

Embodiments of the present disclosure generally relate to the field of electronics, and more specifically relate to a method and apparatus for charging a battery pack, for example, a method and apparatus for charging battery cells of a storage device.

BACKGROUND OF THE INVENTION

In an electronic system such as computer system, data center storage, and server, the electronic systems are powered by a power supply unit PSU in normal operation conditions. Such systems generally have a backup power supply unit such as a battery on bus (BoB) which may power the entire system as a backup whenever the PSU loses alternative current input. Therefore, a backup battery power supply such as BoB plays an important role, such that the system may back up and store important data upon power outage. Therefore, how to make the backup power supply work normally and reliably is vital to an electronic system such as computer system, data center storage, and server. For a backup power supply, it is also a very important performance index to charge quickly and effectively.

Generally, in an electronic system such as computer system, data center storage, and server, backup battery cells are usually implemented as a battery pack including, a plurality of battery cells in series and/or in parallel. For the battery pack including a plurality of battery cells, in series and/or in parallel, it needs to be charted quickly and in balance. An existing typical charging approach uses a dedicated battery management system (BMS) as a controller to manage charging of the battery pack. However, this specific BMS is usually costly but inextensible.

SUMMARY OF THE INVENTION

Exemplary embodiments of the present disclosure relate to a method and apparatus for charging a battery pack.

In a first aspect, there is provided a method for charging a battery pack, comprising: detecting voltages of batteries in the battery pack in real time, charging the battery pack with a charging current that is at least based on the detected voltages; and performing, on the batteries in the battery pack, balance charging by a digital discharging signal.

In some embodiments, the charging the battery pack with a charging current comprises: entering a first charging mode in response to a minimum voltage among the voltages of the batteries in the battery pack being lower than a first voltage; and charging the battery pack with the first charging current during the first charging mode.

In some embodiments, the charging the battery pack with a charging current comprises: entering a second charging mode in response to any of the following: the maximum voltage among the voltages of the batteries in the battery pack is larger than a second voltage and a voltage difference between the maximum voltage and the minimum voltage among the voltages of the batteries in the battery pack is higher than a first difference, or the minimum voltage among the voltages of the batteries in the battery pack is higher than a third voltage; and charging the battery pack with a second charging current during the second charging mode.

In some embodiments, the method further comprises: in response to the voltage difference being lower than a second difference or the maximum voltage being lower than the fourth voltage during the second charging mode, entering the first charging mode.

In some embodiments, the method further comprises: in response to the maximum voltage being higher than a fifth voltage during the second charging mode, performing the balance charging on the batteries in the battery pack.

In some embodiments, the method further comprises: in response to the maximum voltage being lower than a sixth voltage during the second charging mode, entering the first charging mode.

In some embodiments, the method further comprises: in response to the maximum voltage being lower than a fifth voltage but higher than the sixth voltage and the minimum voltage being lower than the first voltage during the second charging mode, entering the first charging mode.

In some embodiments, the performing balance charging on the batteries in the battery pack comprises: during the charging of the battery pack, discharging a battery in the battery pack with a voltage higher than an average voltage of the batteries in the battery pack so as to decrease voltage differences between the batteries in the battery pack.

In some embodiments, the method further comprises: in response to determining that system power is insufficient during the first charging mode, charging the battery pack with a first available current.

In some embodiments, the method further comprises: in response to determining that the system power is insufficient during the second charging mode, charging the battery pack with a second available current.

In a second aspect, there is provided an apparatus for charging a battery pack, the apparatus being configured to: detect voltages of batteries in the battery pack in real time; charge the battery pack with a charging current that is at least based on the detected voltages; and perform, on the batteries in the battery pack, balance charging by using a digital discharging signal.

It may be understood that this portion is not intended to identify key or important features of the embodiments of the present disclosure, nor is it intended to limit the scope of the present disclosure. Other features of the present disclosure will become easily comprehensible through the depiction below.

BRIEF DESCRIPTION OF THE PREFERRED EMBODIMENTS

The above and other advantages, features and objectives of the present disclosure will become more apparent through more detailed depiction of some embodiments of the present disclosure in the accompanying drawings, in which.

In all figures, same or like reference numerals indicate same or similar elements.

DETAILED DESCRIPTION OF THE PREFERRED EMBODIMENTS

Figure 1:
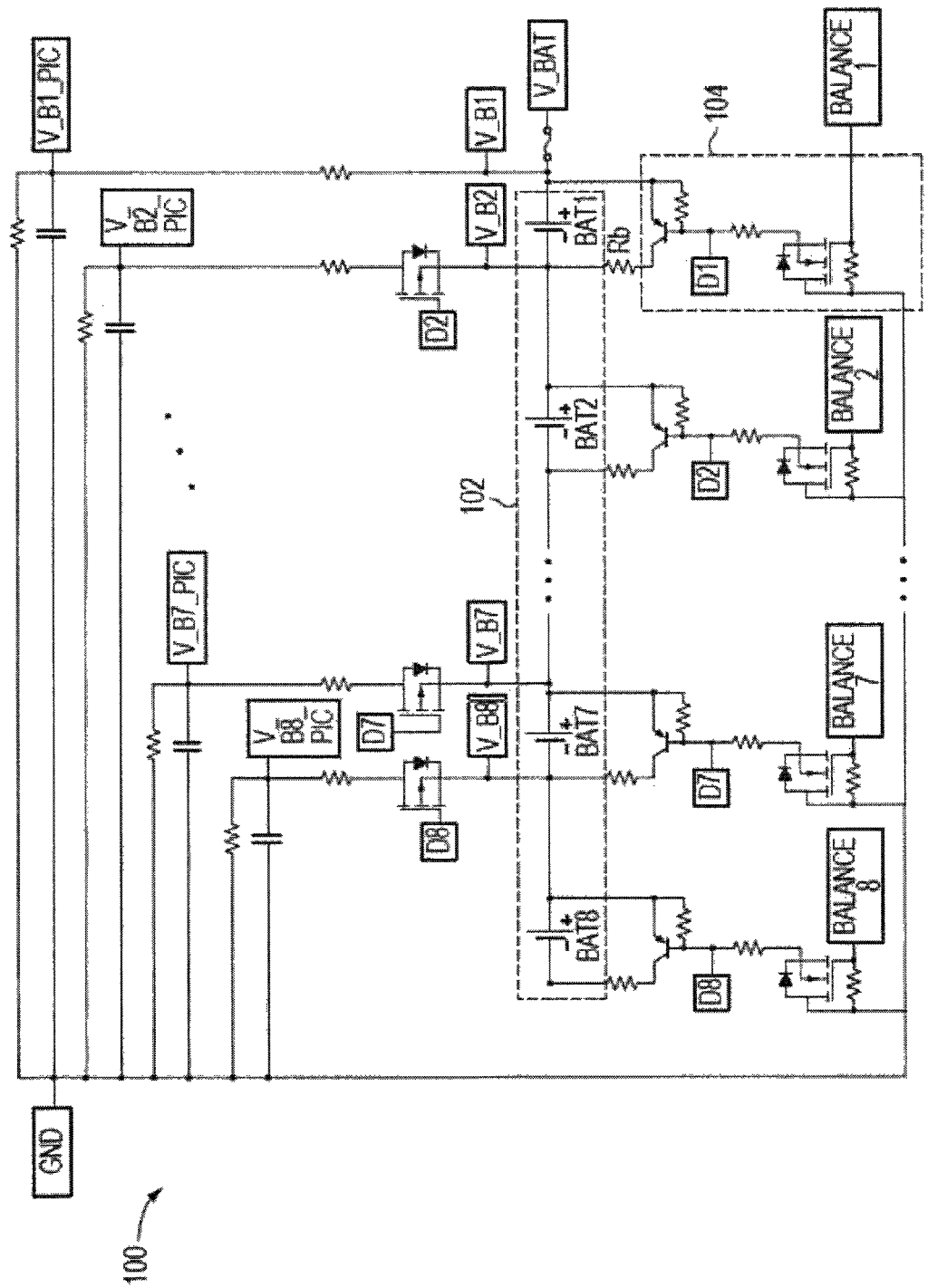
FIG. 1 shows a simplified circuit diagram of an environment according to one embodiment of the present disclosure.

Hereinafter, a principle of the present disclosure will be described with reference to some exemplary embodiments. It will be appreciated that these embodiments are described only for illustrative purposes and to facilitate those skilled in the art to understand and implement the objectives of the present disclosure, not suggesting any limit to the scope of the present disclosure. The content of the present disclosure as described herein may be implemented with various embodiments besides the depiction hereinafter.

As described herein, the term "comprise" and its various variants may be understood as open terms, signifying "including, but not limited to." The term "based on" may be understood as "at least partially based on." The term "one embodiment" may be understood as "at least one embodiment." The term "another embodiment" may be understood as "at least one other embodiment."

The present disclosure generally relates to a method and apparatus for charging a battery pack including a plurality of batteries. The batteries may be, for example, lithium batteries. Those skilled in the art would appreciate that although the present disclosure is illustrated with lithium batteries, the embodiments of the present disclosure may be applied to other types of batteries, e.g., polymer batteries, with corresponding adjustments being performed. Therefore, embodiments with lithium batteries are only for illustration, without limiting the present disclosure.

By detecting in real-time voltages of batteries in a battery pack, current charging conditions of the batteries may be known. Different charging policies may be adopted according to the determination of the charging conditions of the batteries, for example, a large-current (e.g., 5 A) charging policy or a small current (e.g., 1 A) charging policy. When the large-current charging policy is employed, fast charging is enabled. When the small-current charging policy is employed, charging may be performed safely and balance may be achieved faster. A difference such as manufacturing tolerance between different batteries may possibly cause imbalance charging of the batteries in the battery pack. Therefore, it is needed to balance the charging of the batteries in the battery pack, thereby avoiding overcharging of an individual battery. In some embodiments of the present disclosure, it is controllable to turn on and off a discharging unit connected in parallel to an individual battery by using a digital discharging signal from a digital signal processor DSP and the like, so as to implement the discharging of the battery. In this way, balance charging of the battery pack can be realized. In the embodiments of the present disclosure, balance charging of the battery pack refers to that during the charging of the battery pack, discharging a battery in the battery pack with a voltage higher than an average voltage of respective batteries in the battery pack, thereby decreasing voltage differences between the batteries in the battery pack.

Now, refer to FIG. 1, in which an environment 100 according to one embodiment of the present disclosure is shown. The environment 100, for example, may be existent in a backup battery cell of a data storage device. In FIG. 1, the battery pack 102 is illustrated in dotted lines, which, for examples, may comprise 8 lithium batteries in series, BAT1, BAT2 . . . BAT8. As mentioned above, the lithium batteries here are only exemplary, not intended for limiting. Other batteries such as polymer batteries may also be used. Besides, it is only exemplary, not intended to limit the present disclosure that the battery pack comprises 8 batteries. The battery pack may comprise any number of batteries more than 1. In FIG. 1, each of the 8 batteries may also have a respective discharging loop. The discharging loop, for example, may comprise a resistance unit and a switching unit. For example, a loop corresponding to the BAT1 comprises a resistance unit Rb and a switching unit 104 illustrated in dotted lines. The switching unit 104 receives a balance control signal BALANCE 1 from the DSP to control the switching on and off of the switching unit. When the switching unit is switched on, a dipolar transistor connected in series with the resistance unit Rb is switched on, such that the battery BAT1 is discharged via the resistance unit Rb. When the switching unit is switched off, the dipolar transistor connected in series with the resistance unit Rb is switched off. Batteries BAT 2, . . . , BAT8 may respectively have the same resistance unit and switching unit, and controlled by a similar balance control signal BALANCE2, . . . , BALANCE8. In FIG. 1, V-BAT denotes a voltage of the battery pack, V_B1 denotes a voltage of the battery BAT1 relative to GND, V_B2 denotes a voltage of the battery BAT2 relative to GND, . . . , and V_B8 denotes a voltage of the battery BAT8 relative to GND. V_B1_PIC denotes a voltage of the battery BAT1 relative to GND, which is transmitted to a DSP analog-digital converter ADC . . . . Similarly, V_B8_PIC denotes a voltage of the battery BAT8 relative to GND, which is transmitted to the DSP analog-digital converter ADC. BALANCE1 denotes a balance control signal transmitted from the DSP when the voltage of the battery BAT1 needs to be balanced . . . . Similarly, BALANCE 8 denotes a balance control signal transmitted from the DSP when the voltage of the BAT8 needs to be balanced.

It, is seen from FIG. 1 that voltages of the batteries BAT1 to BAT8 may be obtained by monitoring V_B1_PIC to V_B8_PIC in real-time. The monitoring can be performed by the DSP. The DSP may in turn perform determination based on the voltages obtained from the real-time monitoring, and then select a charging policy and transmit digital discharging signals BALANCE1 to BALANCE8 to perform the balance charging on the battery pack. By reusing the DSP in the storage device, a need for a relatively expensive power supply managing controller may be eliminated, thereby reducing the equipment cost. In addition, by controlling each of the batteries separately using a simple discharging circuit as shown in FIG. 1, for example, the charging unit 104, charging may be performed flexibly and in balance.

Figure 2:
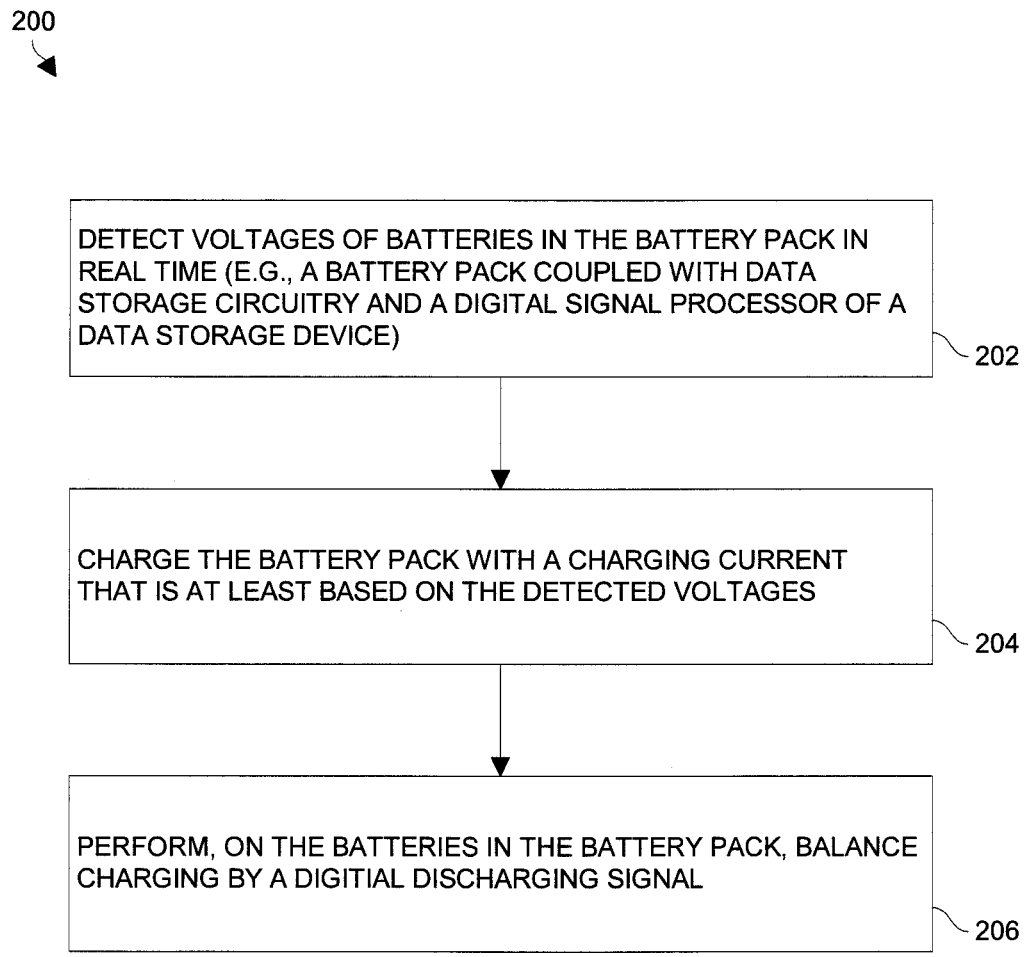
FIG. 2 shows an outline flowchart of a method according to one embodiment of the present disclosure.

Now, refer to FIG. 2, in which a flow diagram of a method 200 according to one embodiment of the present disclosure is shown. In FIG. 2, the method 200 works for charging a battery pack in a storage device, for example. The method is entered in step 202. In step 202, voltages of batteries in the battery pack are detected in real-time. By detecting the voltages of the batteries in real-time, in step 204, a charging policy may be selected based on the detected voltages. Generally, in one embodiment of the present disclosure, there may be three charging modes: 1) large-current charging mode, in which the battery pack is charged with a large charging current, for example, 5 A; 2 ) small-current charging mode, in which the battery pack is charged with a small charging current, e.g., 1 A; 3) balance charging mode, in which the voltages of the batteries in the battery pack are balanced by discharging a battery with a voltage higher than an average voltage of the batteries of the battery pack through a resistance load. The specific numerical values above, such as 5 A and 1 A, are only exemplary, not intended for limitation. It would be appreciated that other current values can be used. In one embodiment of the present disclosure, when the voltages of the batteries in the battery pack are relatively low, a large current may be used for fast charging; while when the voltages of the batteries in the battery pack are relatively high, small-current safe charging may be employed so as to balance the battery pack as quickly as possible. In one embodiment of the present disclosure, when the voltages of the batteries in the battery pack differ greatly, the balance charging mode may be used. The selection of a specific charging mode will be described below. During the balance charging, for example, in step 206, a digital discharging signal from a DSP (for example, in a storage device) may be used to control the switching unit 104 in FIG. 1, such that the battery is discharged via a corresponding resistance unit. As mentioned above, by reusing the DSP unit inside the storage device and using the digital discharging signal from the DSP, the discharging of the battery can be implemented without a demand for a battery managing controller, thereby lowering the cost.

Figure 3:
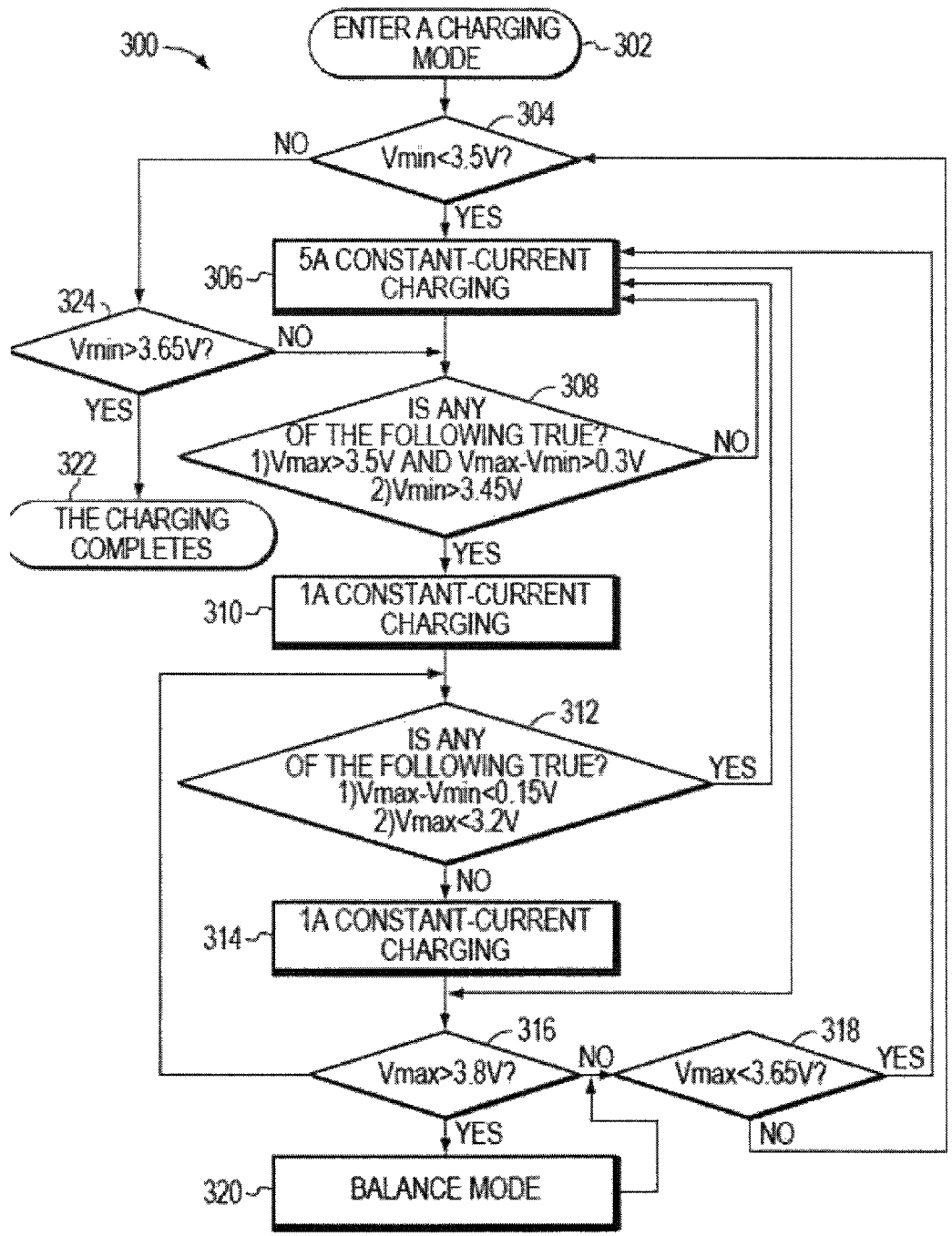
FIG. 3 shows a flowchart according to another embodiment of the present disclosure.

Refer to FIG. 3, in which a flow diagram of a method 300 according to one embodiment of the present disclosure is presented. The method 300 is entered in step 302. In step 302, a charging mode is entered. Determination is made based on the real-time detected battery voltages. For example, in step 304, it is determined whether a minimum battery voltage $V_{min}$ among the batteries in the battery pack is lower than a first voltage (e.g., 3.5V). If the minimum battery voltage is lower than the first voltage, it is indicated that the power of the battery pack is relatively low, such that a large-current charging is needed. Therefore, a first charging policy can be selected so as to charge with a first charging current (e.g., 5 A) in step 306.

If the minimum battery voltage is higher than or equal to the first voltage, a further determination may be needed. For example, in step 324, it is determined whether the minimum voltage $V_{min}$ is higher than a seventh voltage, e.g., 3.65V. If the minimum voltage $V_{min}$ is higher than the seventh voltage, it is indicated that the charging has been substantially completed. Then the method 300 proceeds to step 322. That is, the charging is completed.

If the minimum voltage $V_{min}$ is not higher than the seventh voltage, the method 300 proceeds to step 308. Besides, during the charging process with the first current, the determination in step 308 is also needed. In step 308, it is determined whether at least one of the following scenarios exists: (1) the maximum voltage $V_{max}$ among the batteries in the battery pack is higher than a second voltage (e.g., 3.5V) and a difference between the maximum voltage $V_{max}$ and the minimum voltage is higher than a first difference voltage (e.g., 0.3V): (2) the minimum voltage $V_{min}$ is higher than the third voltage (e.g., 3.45V). If the above scenario (1) exists, that is, the maximum voltage $V_{max}$ is higher than the second voltage and the difference is higher than the first, difference voltage, it is indicated that the battery pack has been charged partially, and it may need to be charged with a small current. If the scenario (2) exists, that is, the minimum voltage $V_{min}$ is higher than the third voltage, it is also indicated that the battery pack has been charged partially, and it may need to be charged with a small current. Therefore, in step 310, a second charging mode is entered, during which the battery pack is charged with a second charging current, e.g., 1 A.

If neither of the two conditions exists in step 308, the first charging mode continues, during which the first charging current (e.g., 5 A) is used for charging.

In the second charging mode, the voltages of the batteries in the battery pack are also detected in real-time. In step 312, it is determined whether at least, one of the following two scenarios exists: (1) a difference between the maximum voltage Vmax and the minimum voltage $V_{min}$ is lower than a second difference voltage (e.g., 0.15V); (2) the maximum voltage $V_{max}$ is lower than a fourth voltage (e.g., 3.2V). If the scenario (1) exists, that is, the difference is lower than the second difference voltage, it may indicate that the power of the battery pack is relatively low, and a large current is needed for charging. Therefore, the first charging mode may be returned, and the battery pack may be charged with the large first charging current. If the scenario (2) exists, that is, the maximum voltage $V_{max}$ is lower than the fourth voltage, it may also indicate that the power in the battery pack is relatively low, and a large current is needed for charging. Therefore, the first charging mode may be returned, and the battery pack may be charged with a large first charging current.

If neither of the two scenarios exists, in step 314, the second charging mode continues and the battery pack is charged with the second charging current. In step 316, it is determined whether the maximum voltage $V_{max}$ in the battery pack is higher than a fifth voltage (e.g., 3.8V). If the maximum voltage $V_{max}$ is higher than the fifth voltage 3.8V, it may indicate that the maximum voltage in the battery pack is almost reached or the charging is already completed, and it may be needed to charge the batteries in the battery pack in balance. Therefore the balanced charging mode is entered 320. If the maximum voltage $V_{max}$ is not higher than the fifth voltage, a further determination may be needed. For example, in step 318, it is determined whether the maximum voltage $V_{max}$ is lower than a sixth voltage, e.g., 3.65V. If the maximum voltage $V_{max}$ is lower than the sixth voltage, it may indicate that the battery pack has a low power and needs to be charged with a large current. Therefore, the first charging mode may be returned, the battery pack may be charged with the first current. If the maximum voltage $V_{max}$ is not lower than the sixth voltage, a further determination may be needed. Therefore, step 304 is returned.

In the balance mode, as mentioned above, during the charging of the battery pack, a battery in the battery pack with a voltage higher than an average voltage of the batteries among the battery pack may be discharged, thereby lowering differences between the batteries in the battery pack. Besides, during the balance mode, it may be also needed to detect the maximum voltage $V_{max}$ in real-time for a further determination. For example, in step 318, it is determined whether the maximum voltage $V_{max}$ is lower than the sixth voltage, it is indicated that the battery pack has a low power, and it may need to be charged with a large current. Therefore, the first charging mode is returned, and the battery pack is charged with the first current. If the maximum voltage $V_{max}$ is not lower than the sixth voltage, a further determination may be needed. Therefore, the method 300 returns to step 304.

The specific voltage and current values mentioned above are only exemplary, not intended to limit the present disclosure. It may be understood that other current and voltage values can be used. Besides, the flow of the method 300 is also used for illustration only, not for limiting steps and sequences. Other steps and sequences and combinations thereof may be used. For example, in a specific practice, step 316 and step 318 may be merged into one step for execution, instead of executing step 316 at first and then executing step 318.

Figure 4:
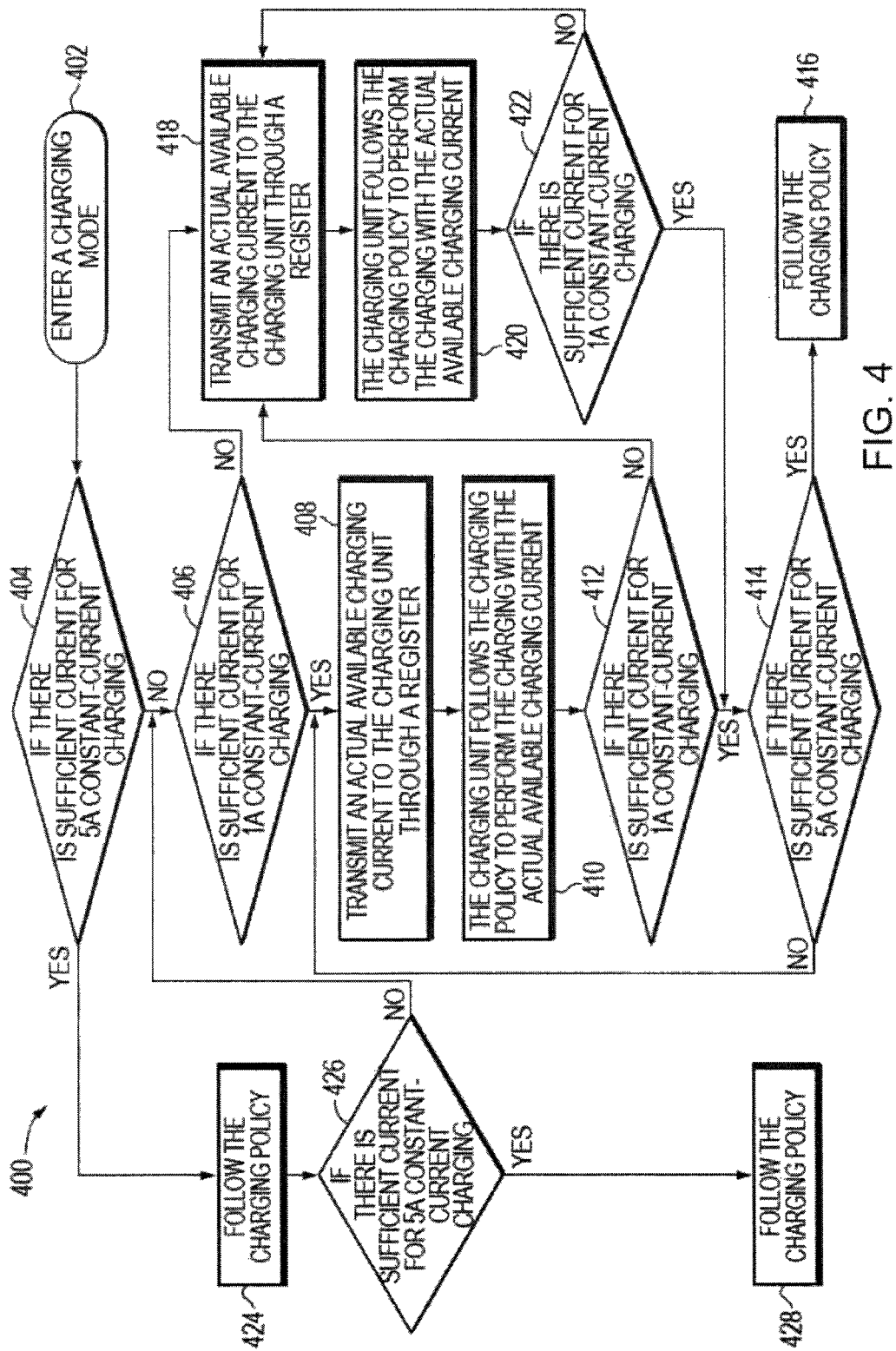
FIG. 4 shows a flowchart according to yet another embodiment of the present disclosure.

Now, refer to FIG. 4, in which a flow diagram of a method 400 according to another embodiment of the present disclosure is presented. In some cases, a system such as a storage device system is not surely capable of providing the current required by a charging policy. For example, in the method of FIG. 3, during the charging of the battery pack with the first charging current in the first charging mode, the system might not be capable of providing a 5 A current, but might only be capable of providing a 3 A current. During the charging of the battery pack with the second charging current in the second charging mode, the system might not be capable of providing a 1 A current, but might be only capable of providing a 0.5 A current. In this case, the charging method as illustrated in FIG. 3 may need some adaptions.

In step 402, a charging mode is entered. In step 404, an apparatus such as power supply management may determine whether the system is capable of providing sufficient current for constant-current charging with the first current, for example. If there is sufficient current for 5 A constant-current charging, the charging policy is followed in step 424. For example, the first charging policy and the second charging policy as shown in FIG. 3 may be followed. Then, in step 426, it is continued to determine whether the system has enough current to support 5 A constant current charging. If there is still sufficient current, in step 428, the charging policy continues to be followed. For example, the first charging policy and the second charging policy as shown in FIG. 3 may be followed.

If there is no sufficient current, in step 406, it is further determined whether there is sufficient current for 1 A constant-current charging. Besides, in step 404, when it is determined that there is no sufficient current to support 5 A charging, the method 400 proceeds to step 406 to further determine whether there is sufficient current for 1 A constant-current charging. When there is sufficient current to support 1 A constant-current charging, in step 408, an actual available charging current (e.g., 3 A) is transmitted to the charging unit through a register. In step 410, the charging unit follows the charging policy to perform the charging with the actual available charging current. For example, in the first charging mode, 3 A, rather than 5 A, may be used for charging. In the case of the second charging mode, 1 A, rather than 3 A, may be used for charging. In step 412, it is determined whether there is sufficient current for 1 A constant current charging. If yes, a further determination is performed. For example, in step 414, it is determined whether there is sufficient current to support 5 A constant current charging. If the current is sufficient to support 5 A charging at this point, in step 416, the charging policy is followed. For example, the first charging policy and the second charging policy as shown in FIG. 3 may be followed. If there is sufficient current to support 5 A constant-current charging in step 414, the method 400 returns to step 408 to transmit an actual available charging current (e.g., 3 A) to the charging unit through a register.

In step 412, if the actual available charging current is insufficient to support 1 A constant current charging, in step 418, the actual available charging current (e.g., 0.5 A) is transmitted to the charging unit through the register. In step 420, the charging unit follows the charging policy to perform the charging with the actual available charging current (e.g., 0.5 A), rather than 1 A. In step 422, it is determined whether the actual available charging current is sufficient to support 1 A constant-current charging. If yes, a further determination may be needed. For example, in step 414, it is further determined whether there is sufficient current to support 5 A charging. If it is determined in step 422 that there is insufficient current to support 1 A constant-current charging, the method 400 returns to step 418.

The specific current values mentioned above in method 400 of FIG. 4 are only exemplary, not intended to limit the present disclosure. It should be understood that other current values can be used. Besides, the flow of method 400 is also used for illustration only, not for limiting steps and sequences. Other steps and sequences and combinations thereof may be used. For example, in a specific practice, step 422 and step 414 may be merged into one step for execution, instead of executing step 422 at first and then executing step 414. In addition, it may be understood that the method 400 can be used in conjunction with methods 200 and 300 in FIGS. 2 and 3.

Generally speaking, various embodiments of the present disclosure may be implemented with hardware or dedicated circuit, software, logic or any combination thereof. Some aspects may be implemented with hardware, while some other aspects may be implemented with firmware or software. The firmware or software may be executed by a controller, a microprocessor or other computing device. Although various aspects of the present disclosure are illustrated and described by block diagrams, flow diagrams or other maps, it may be understood that the blocks, devices, systems, technologies or methods described herein may be implemented in a non-limiting way by hardware, software, firmware, dedicated circuit or logic, general hardware or controller or other computing device or some combinations thereof.

Besides, although the operations are described in a specific order, it should not be understood to require that these operations should be executed in the illustrated order or executed sequentially in the order, or require that all of the illustrated operations should be executed to achieve a desired outcome. In some cases, multi-task or parallel processing may be advantageous. Similarly, although details of a plurality of specific implementations have been included in the discussion above, these should not be interpreted as any limitation to the scope of the present disclosure. Instead, the features are described only for specific embodiments. Some features described in some separate embodiments may also be executed in combination in a single embodiment. On the contrary, various features described in a single embodiment may also be separately implemented in various embodiments or implemented any appropriate sub-combination manner.

Although the present disclosure is described with specific structural features and/or method actions, it may be understood that the present disclosure limited in the appended claims is not necessarily limited to the specific features or actions above. Instead, the specific features and actions above are only disclosed as exemplary forms for implementing the claims.

We claim:

1. A method for charging a battery pack, comprising:
   detecting voltages of batteries in the battery pack in real time;
   charging the battery pack with a charging current that is at least based on the detected voltages; and
   performing, on the batteries in the battery pack, balance charging by a digital discharging signal,
   wherein charging the battery pack with the charging current comprises:

entering a large-current charging mode in response to a minimum voltage among the voltages of the batteries in the battery pack being lower than a first voltage;

charging the battery pack with a first charging current, the first charging current having a first constant current value during the large-current charging mode;

entering a small-current charging mode in response to a maximum voltage among the voltages of the batteries in the battery pack being larger than the first voltage and a voltage difference between the maximum voltage and the minimum voltage among the voltages of the batteries in the battery pack being higher than a first voltage difference;

charging the battery pack with a second charging current, the second charging current having a second constant current value smaller than the first constant current value during the small-current charging mode, wherein entering the small-current charging mode includes entering the small-current charging mode in response to the minimum voltage among the voltages of the batteries in the battery pack being higher than a second voltage, the second voltage being lower than the first voltage;

in response to the voltage difference being lower than a second voltage difference or the maximum voltage being lower than a third voltage during the small-current charging mode, entering the large-current charging mode, the second voltage difference being lower than the first voltage difference, and the third voltage being lower than the second voltage;

in response to the maximum voltage being higher than a fourth voltage during the small-current charging mode, performing the balance charging on the batteries in the battery pack, the fourth voltage being higher than the first voltage; and in response to the maximum voltage being lower than a fifth voltage during the small-current charging mode, entering the large-current charging mode, the fifth voltage being lower than the fourth voltage but higher than the first voltage.

2. The method according to claim 1, wherein performing the balance charging comprises:

during the charging of the battery pack, discharging a battery in the battery pack with a voltage higher than an average voltage of the batteries in the battery pack so as to decrease voltage differences between the batteries in the battery pack.

3. The method according to claim 1, wherein charging the battery back with the first charging current is performed in response to determining that system power is insufficient during the large-current charging mode.

4. The method according to claim 1, wherein charging the battery back with the second charging current is performed in response to determining that system power is insufficient during the small-current charging mode.

5. The method according to claim 1, wherein performing balance charging includes:

while the battery pack operates (i) in a charging mode and (ii) as a backup power source that supplies backup power to a data storage device, discharging a battery of the battery pack in response to the digital discharging signal which is provided by a digital signal processor of the data storage device.

6. The method according to claim 5, wherein discharging the battery of the battery pack is performed based on a discharging loop comprising a transistor and a resistor, the transistor and the resistor being connected in series, the transistor discharging the battery via the resistor in response to the digital discharging signal.

7. An apparatus for charging a battery pack, the apparatus being configured to:

detect voltages of batteries in the battery pack in real time;

charge the battery pack with a charging current that is at least based on the detected voltages;

perform, on the batteries in the battery pack, balance charging by using a digital discharging signal;

enter a large-current charging mode in response to a minimum voltage among the voltages of the batteries in the battery pack being lower than a first voltage;

charge the battery pack with a first charging current that has a first constant current value during the large-current charging mode;

enter a small-current charging mode in response to a maximum voltage among the voltages of the batteries in the battery pack being larger than the first voltage and a voltage difference between the maximum voltage and the minimum voltage among the voltages of the batteries in the battery pack being higher than a first voltage difference;

charge the battery pack with a second charging current that has a second constant current value smaller than the first constant current value during the small-current charging mode, wherein the apparatus is further configured to enter the small-current charging mode in response to the minimum voltage among the voltages of the batteries in the battery pack being higher than a second voltage, the second voltage being lower than the first voltage;

in response to the voltage difference being lower than a second voltage difference or the maximum voltage being lower than a third voltage during the small-current charging mode, enter the large-current charging mode, the second voltage difference being lower than the first voltage difference, and the third voltage being lower than the second voltage;

in response to the maximum voltage being higher than a fourth voltage during the small-current charging mode, perform the balance charging on the batteries in the battery pack, the fourth voltage being higher than the first voltage; and in response to the maximum voltage being lower than a fifth voltage during the small-current charging mode, entering the large-current charging mode, the fifth voltage being lower than the fourth voltage but higher than the first voltage.

8. The apparatus according to claim 7, wherein the apparatus is further configured to:

during the charging of the battery pack, discharge a battery in the battery pack with a voltage higher than an average voltage of the batteries in the battery pack so as to decrease voltage differences between the batteries in the battery pack.

9. The apparatus according to claim 7, wherein the apparatus is further configured to:

in response to determining that system power is insufficient during the large-current charging mode, charge the battery pack with the first charging current.

10. The apparatus according to claim 7, wherein the apparatus is further configured to:

in response to determining that the system power is insufficient during the small-current charging mode, charge the battery pack with the second charging current.

* * * * *